United States Patent
Walker, III (10) Patent No.: US 7,117,785 B2
(45) Date of Patent: Oct. 10, 2006

(54) GARLIC PRESS

(75) Inventor: Thomas B. Walker, III, Huntersville, NC (US)

(73) Assignee: Rubbermaid Incorporated, Wooster, OH (US)

( * ) Notice: Subject to any disclaimer, the term of this patent is extended or adjusted under 35 U.S.C. 154(b) by 0 days.

(21) Appl. No.: 10/857,661

(22) Filed: May 28, 2004

(65) Prior Publication Data

US 2005/0263016 A1 Dec. 1, 2005

(51) Int. Cl.
*B30B 9/06* (2006.01)

(52) U.S. Cl. .................. 100/126; 100/112; 100/234; 100/243; 241/169; 241/169.2; 99/495; D7/666

(58) Field of Classification Search ............... 100/110, 100/116, 126, 127, 131, 132, 213, 234, 130, 100/243; 99/495, 510; 241/169, 169.2, 241/DIG. 27; D7/665, 666
See application file for complete search history.

(56) References Cited

U.S. PATENT DOCUMENTS

| | | | |
|---|---|---|---|
| 2,776,616 A * | 1/1957 | Sarossy | 100/234 |
| 4,348,950 A | 9/1982 | Harris | |
| 5,101,720 A * | 4/1992 | Bianchi | 100/99 |
| 5,165,335 A | 11/1992 | Bianchi | |
| 5,370,044 A | 12/1994 | Lackie | |
| 5,463,941 A | 11/1995 | Gibson | |
| 5,467,699 A | 11/1995 | Laib | |
| 5,513,562 A | 5/1996 | Moor | |
| 5,529,252 A | 6/1996 | Baines | |
| 5,791,237 A | 8/1998 | Gibson | |
| 6,109,170 A | 8/2000 | Short et al. | |
| 6,237,474 B1 | 5/2001 | Short et al. | |
| 6,505,548 B1 | 1/2003 | Lillelund et al. | |
| 6,966,256 B1 * | 11/2005 | Canizares et al. | 100/126 |
| 2003/0222162 A1 * | 12/2003 | Klamer | 241/95 |
| 2003/0234205 A1 * | 12/2003 | McGuyer et al. | 206/564 |
| 2004/0061010 A1 * | 4/2004 | Keller | 241/169 |
| 2004/0074403 A1 * | 4/2004 | Canizares et al. | 100/234 |

\* cited by examiner

*Primary Examiner*—Daniel Crane
*Assistant Examiner*—Jimmy Nguyen
(74) *Attorney, Agent, or Firm*—Lempia IP Group, LLC (57) ABSTRACT

A food press includes upper and lower portions each having first and second ends, a plunger, a chamber, and a grate. The upper and lower portions are pivotally connected at their respective first ends. The plunger is disposed between the upper and lower portions. The chamber is disposed on the lower portion and includes an inlet and an outlet and is adapted to receive the plunger. The grate is pivotally connected to the lower portion and is disposed in the chamber in a user position and is disposed between the second ends of the upper and lower portions in a cleaning position.

23 Claims, 7 Drawing Sheets

GARLIC PRESS

BACKGROUND OF THE INVENTION

1. Field of the Disclosure

The present disclosure is generally directed to a food press and, more particularly, to a garlic press that includes easy-to-operate and easy-to-clean features.

2. Description of Related Art

Garlic presses are known in the art. For example, U.S. Pat. No. 5,165,335 discloses a cross-ribbed garlic press. The cross-ribbed garlic press includes a grate in which perforations are created by inside and outside grooves running at angles to each other. A ram wall is provided with ridges which mate with the inside grooves of the grate. These grooves and ridges can be cleaned by scraping or wiping comb teeth along them. The comb teeth protrude from the far ends of the two levers, wherein one is attached to the ram, and the other is attached to the cup. The two parts are joined by a detachable hinge that allows the comb of one part to be engaged with the corrugations of the other.

In another example, U.S. Pat. No. 5,463,941 discloses a garlic press that does not require the clove to be separated and peeled, effecting the pressing operation without orienting the clove in the press. The garlic press permits a mechanism to automatically open when pressure is released for removal of the remains. Cleaning the parts is simple because of the open construction and ease of washing the parts when in an open position.

In yet another example, U.S. Pat. No. 6,505,548 discloses a garlic press having a pivotally-joined base and handle with an intermediate press plate pivoted therebetween and cooperating with the base in defining a receiving chamber selectively receiving an enlarged pressure block formed on the handle. The press plate includes a bladed cutter assembly engageable with the upper surface of the base for the severing of a base supported item. The base has an elongate hand-receiving opening formed therein to define an upper hand grip functioning in conjunction with the handle to manipulate the press, and a lower base support, below the opening, for a direct supporting engagement of the base on a support surface. This allows operation of the press by a direct downward pressure on the handle against a surface-supported base.

These and other garlic presses known in the art do, however, have inherent limitations and drawbacks that make the garlic presses difficult to use and clean.

BRIEF DESCRIPTION OF THE DRAWINGS

Objects, features, and advantages of the present device will become apparent upon reading the following description in conjunction with the drawing figures, in which.

While the method and device described herein are susceptible to various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the disclosure as defined by the appended claims.

DETAILED DESCRIPTION OF THE DISCLOSURE

Figure 1:
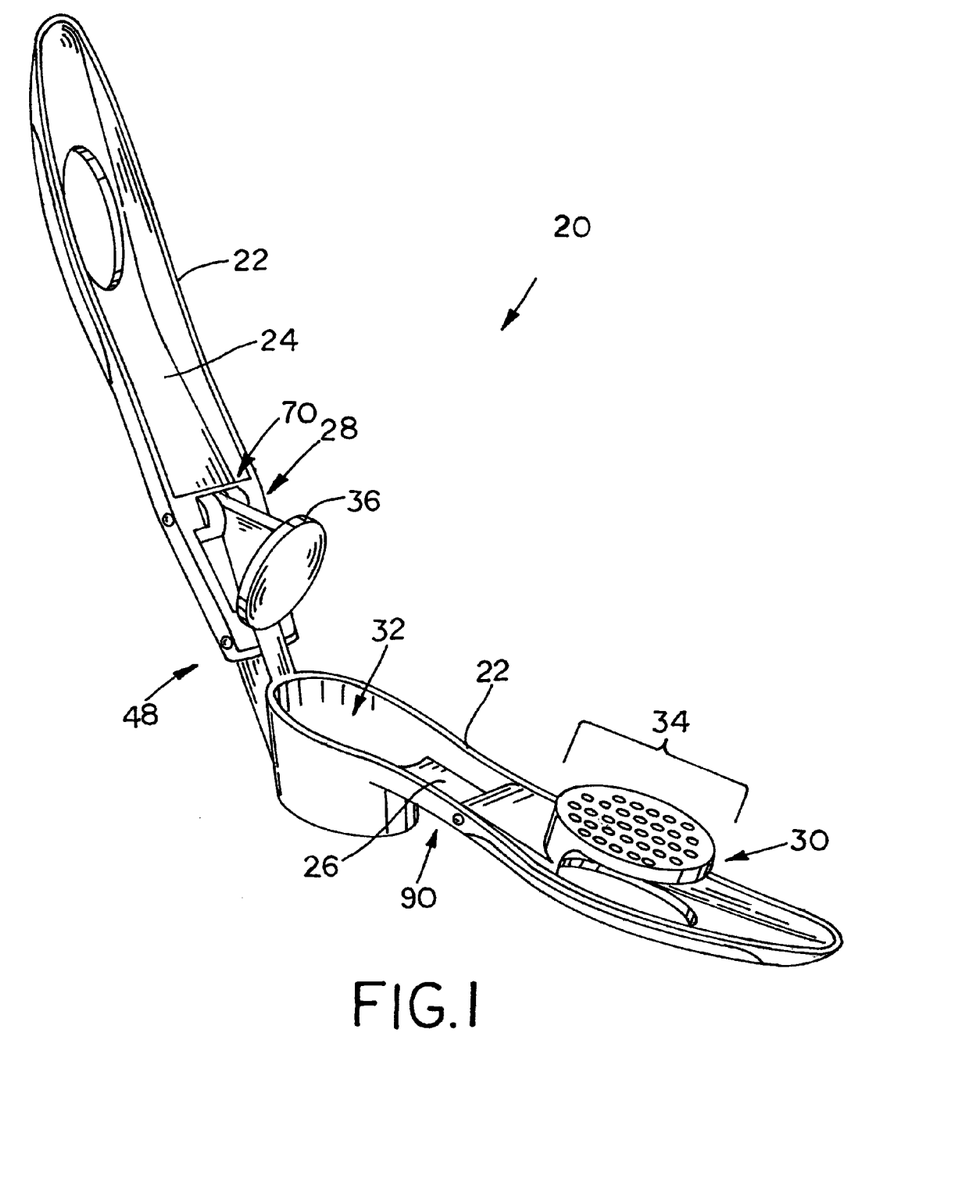
FIG. 1 is an isometric view of one example of a garlic press constructed according to one embodiment of the disclosure.

Referring now to the drawings, and with specific reference to FIG. 1, a garlic press constructed in accordance with the teachings of the disclosure is generally depicted by reference numeral 20. As shown therein, the garlic press 20, in this exemplary embodiment, includes a body 22 having an upper portion 24 pivotally connected to a lower portion 26, a plunger assembly 28, and a grate assembly 30. The garlic press 20, as disclosed herein, may be utilized to provide crush, squeeze, peel, and/or grate operations for related items such as garlic, onions, and the like. More specifically, when the press 20 is configured in a use position, a user may place a peeled or unpeeled clove of garlic, or pieces thereof, into a work chamber 32 and force the glove of garlic through a grate 34 of the grate assembly 30 located at a bottom of the chamber 32 with a plunger 36 of the plunger assembly 28. After use, when changed to be configured in a cleaning position, the user may pivot the grate 34 from the work chamber 32 for easy cleaning of the garlic press 20.

In one exemplary embodiment, the body 22 may be constructed from a zinc die-cast material, and may have a generally elongate hollow shape. The upper and lower body portions 24, 26, in creating the generally hollow shape of the body 22, may have a generally semi-circular cross-sectional shape, such that when the upper and lower portions 24, 26 are placed adjacent each other they create an aesthetically pleasing elongate garlic press 20.

Figure 2:
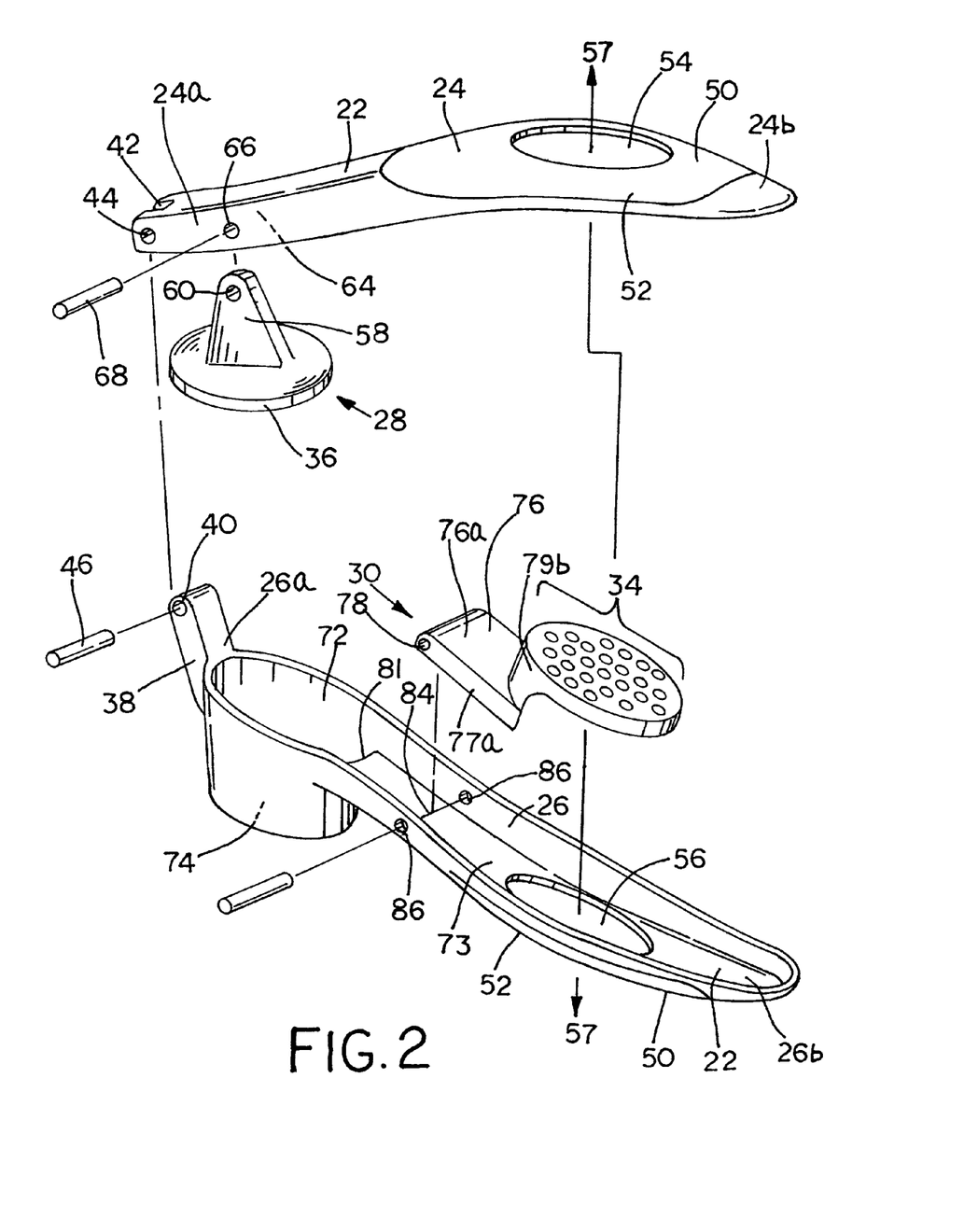
FIG. 2 is an exploded isometric view of the garlic press of FIG. 1.

The upper and lower portions 24, 26 of the body 22, as seen in FIG. 2, may be pivotally connected near their respective first ends 24a, 26a. More specifically, disposed on the first end 24a of the lower portion 26 may be a post or protrusion 38 having an aperture 40 that is sized and shaped to engage a notch 42 and a pair of apertures 44 as disposed on the first end 24a of the upper portion 24. A pin 46 may be placed through the aperture 40 and the pair of apertures 44 when the post 38 is engaged with the notch 42, thereby creating a first pivot assembly 48 (FIG. 1).

A handle 50 is disposed on second ends 24b, 26b of the upper and lower portions 24, 26 of the body 22, which may include one or more gripping portions 52 to aid in the comfort, performance, and appearance of the handle 50. The gripping portion may be disposed on an exterior surface of the handle 50 or the second respective body portion ends 24b, 26b, and may be constructed from a Thermoplastic Elastomer ("TPE") material. Apertures 54, 56 may be disposed near the second ends 24b, 26b of the upper and lower portions 24, 26 of the body 22, and may be aligned relative to each other such that an opening 57, generally the size and shape of the apertures 54, 56, is cooperatively formed to exist through the body 22 of the garlic press 20. The apertures 54, 56 may be oval shaped, but also may be any other shape including but not limited to square, round triangular, rectangular, odd shaped, and any combination thereof.

Figure 3:
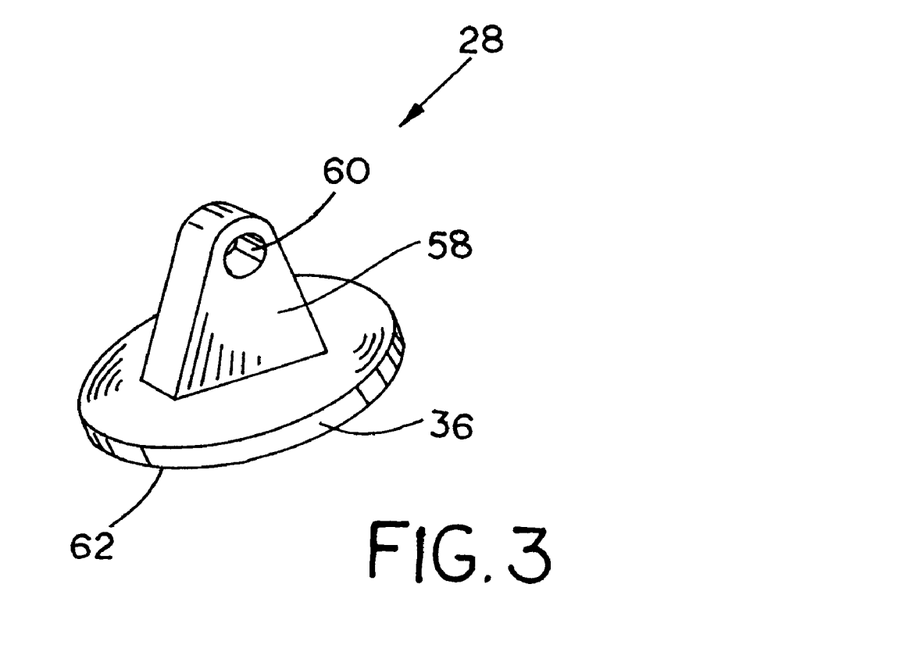
FIG. 3 is a detailed isometric view of a plunger of the garlic press of FIG. 1.

The plunger assembly 28, as seen in FIG. 3, may be pivotally connected to the upper body portion 24, and may include a plunger lever 58 having an aperture 60 disposed at an upper end, and the plunger 36 disposed at a lower end. The plunger 36 includes a generally smooth bottom surface 62 for contacting the object to be pressed, such as a garlic clove, and may have a generally oval shape that compliments the size and shape of the work chamber 32. More specifically, the size and shape of the plunger 36 may be formed such that just enough clearance exists between the plunger 36 and the work chamber 32 for the plunger to enter the chamber 32. The upper end of the plunger lever 58, having the aperture 60, may be sized and shaped to engage a notch 64 and a pair of apertures 66 (FIG. 2) disposed on the upper body portion 24. As seen in FIG. 2, a pin 68 may be placed through the aperture 60 and the pair of apertures 66 when the plunger lever 58 is engaged with the notch 64, thereby creating a second pivot assembly 70.

Figure 6:
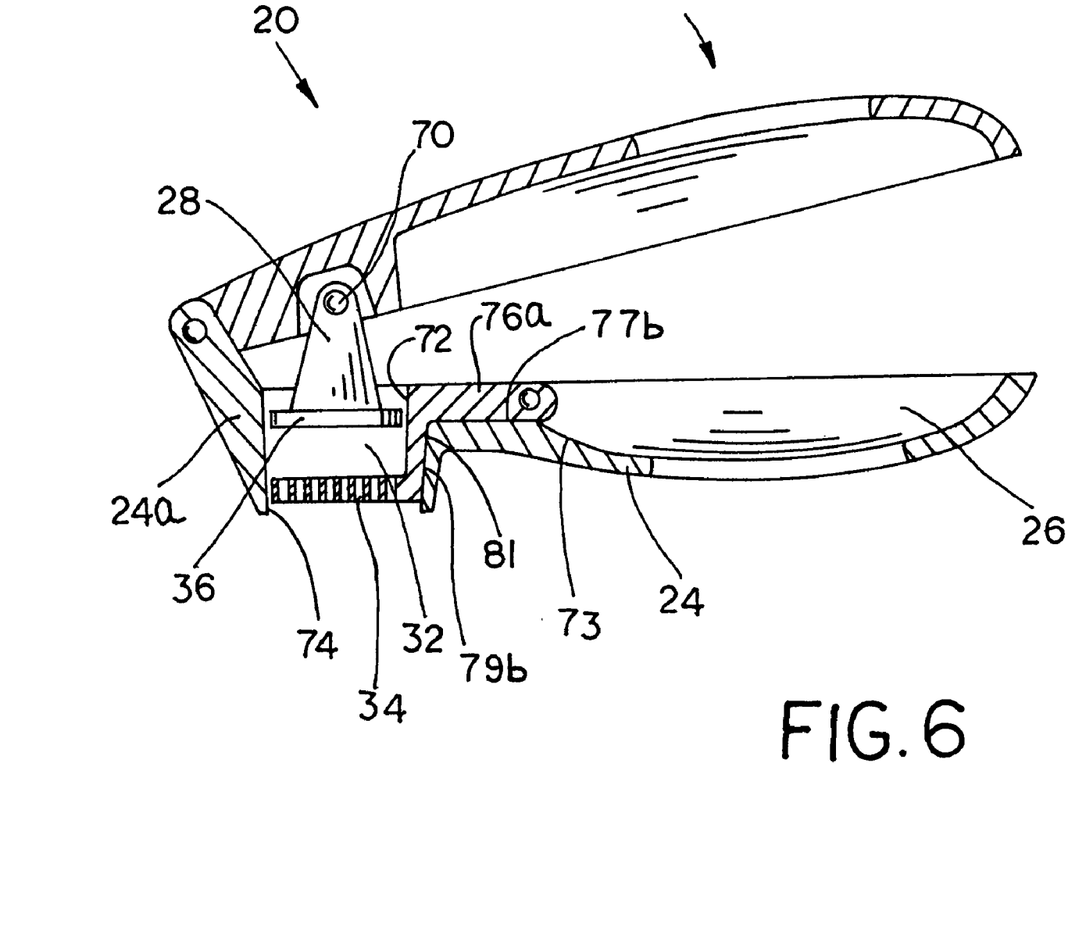
FIG. 6 is a cross-sectional view of the garlic press in a user position along line 6-6 of FIG. 5.

The work chamber 32, as seen in FIGS. 2 and 6, has an inlet 72 and an outlet 74, and may be disposed near the first end 26a of the lower portion 26 of the body 22. As discussed previously, the size and shape of the chamber 32 may correspond to the size and shape of the plunger 36.

Figure 4:
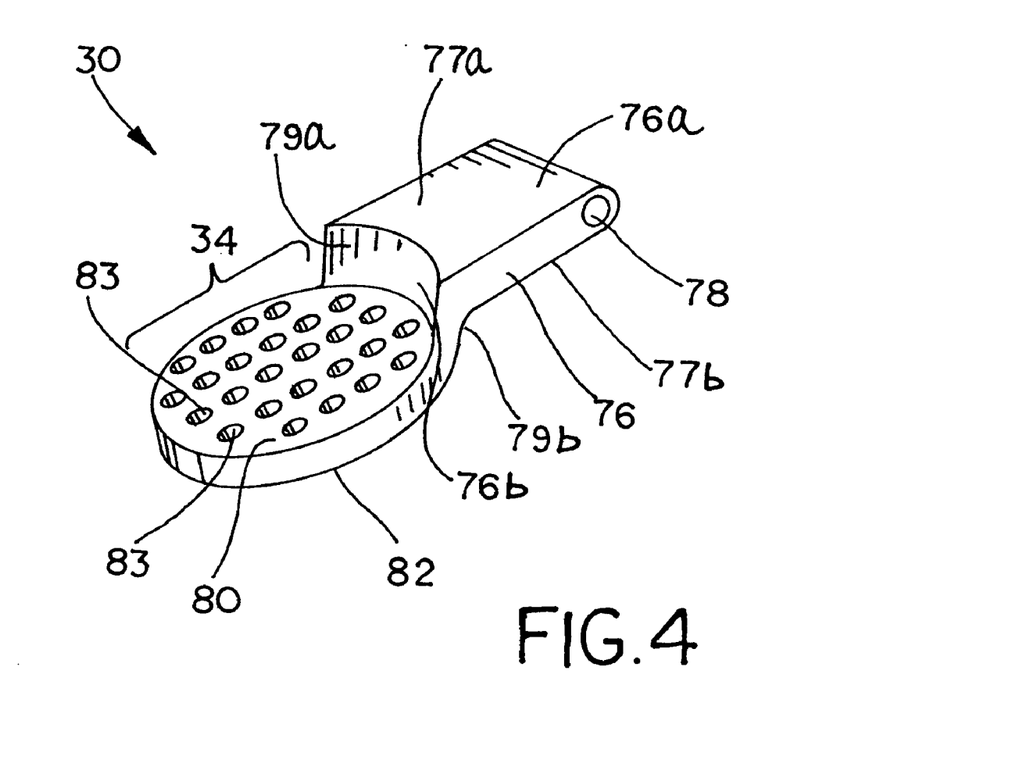
FIG. 4 is a detailed isometric view of a grate assembly of the garlic press of FIG. 1.

The grate assembly 30, as seen in FIG. 2 and 4, may be pivotally connected to the lower portion 26, between work and cleaning positions, and may include a grate lever 76, having an upper lever arm 76a and a lower lever arm 76b. The upper lever arm 76a may have an aperture 78 disposed at one end and the lower lever arm 76b disposed at an opposite end, and may include an upper surface 77a and a lower surface 77b. In the user or work position, with the grate 34 disposed in the work chamber 32, at least a portion of the lower surface 77b of the upper lever arm 76a is in contact with and rests upon an inside surface 73 of the lower body portion 26, as seen in FIG. 6. Similarly, in the rotated-open cleaning position (see FIG. 2), with the grate 34 removed from the chamber 32, at least a portion of the upper surface 77a of the upper lever arm 76a is in contact with and rests upon the inside surface 73 of the lower portion 26. The lower lever arm 76b (FIG. 4) may have disposed at one end the upper lever arm 76a, and disposed at an opposite end the grate 34, and may include an inner surface 79a and an outer surface 76b. The lower lever arm 76b may be sized and shaped to engage or correspond to at least a portion of the work chamber 32 (FIG. 2). More specifically, in the rotated-closed work or user position, a majority of the outer surface 79b of the lower lever arm 76b may be in contact and rest upon an inside surface of the chamber 32. In that mode, the inner surface 79a of the lower lever arm 76b may be substantially parallel to the outer surface 79b and may be adapted to receive and/or engage the object to be pressed.

The grate 34, as seen in FIG. 4, includes generally smooth upper and lower surfaces 80, 82, respectively, and may have a generally oval shape that compliments the size and shape of the work chamber 32. More specifically, the size and shape of the grate 34 may be formed such that just enough clearance exists between the grate 34 and the chamber 32 for the grate 34 to be cooperatively received in and enter the work chamber 32. The grate 34 further includes a plurality of apertures 83 extending between the upper and lower surfaces 80, 82 that create in combination the grate 34.

Figure 5:
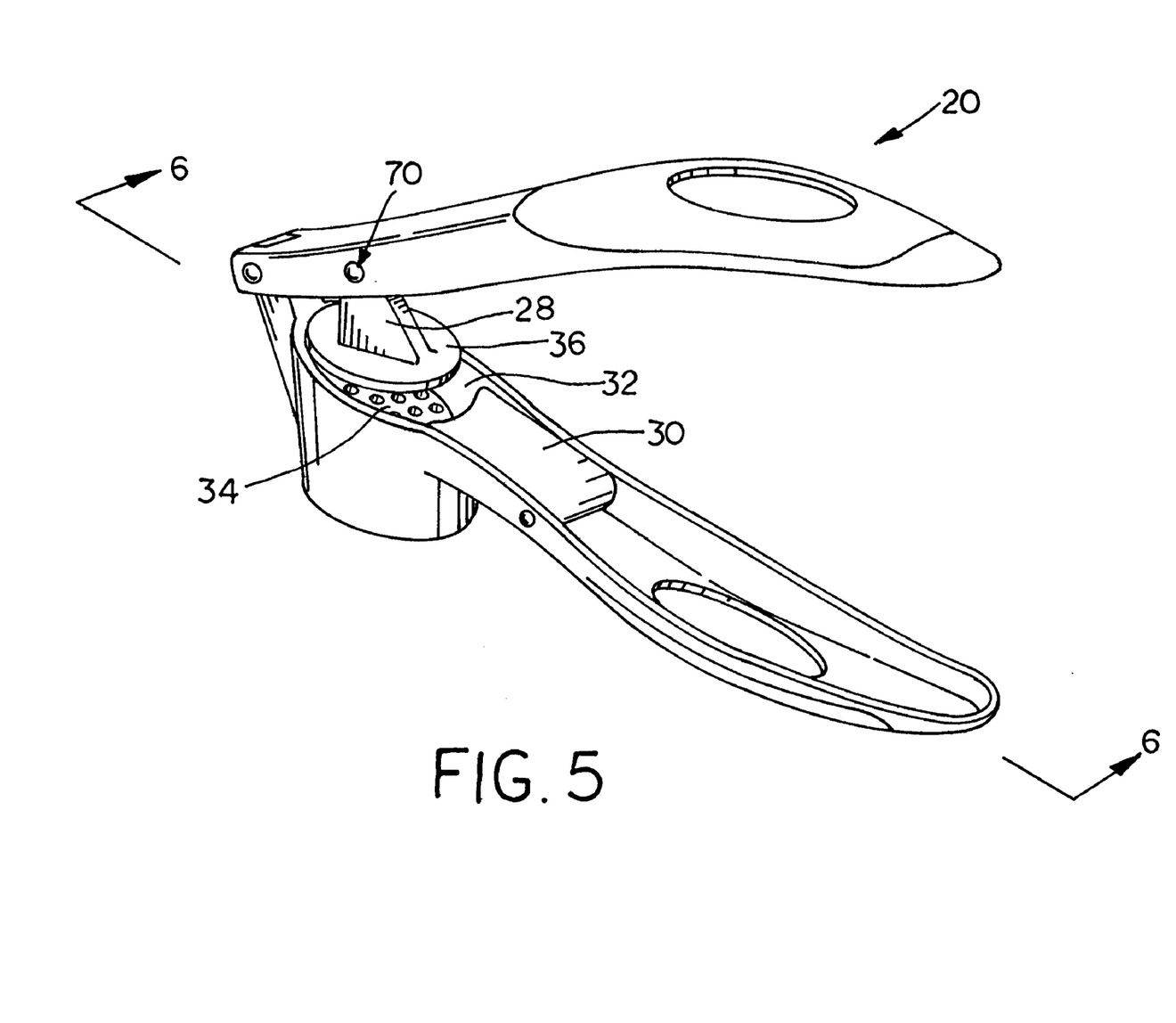
FIG. 5 is an isometric view of the garlic press of FIG. 1 in a user position.
Figure 8:
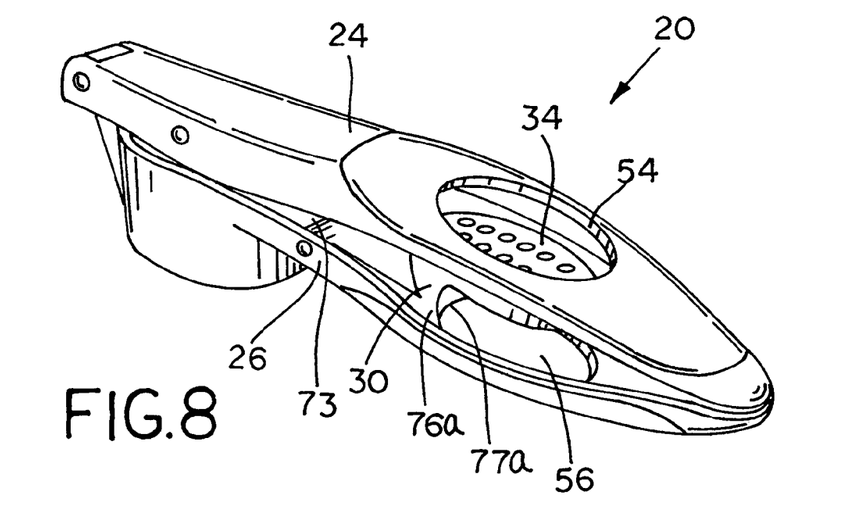
FIG. 8 is an isometric view of the garlic press of FIG. 1 in a cleaning position.

As seen in FIG. 2, the upper end of the grate lever 76, having the aperture 78, may be sized and shaped to engage a notch 84 and a pair of apertures 86 disposed on the lower portion 26. A pin 88 may be placed through the aperture 78 and the pair of apertures 86 when the grate lever 76 is engaged with the notch 84, thereby creating a third pivot assembly 90 (FIG. 1). The grate assembly 30 may be positioned and oriented from the work chamber 32, such that the grate assembly 30 and, more specifically, the grate 34 can pivot into and out of the chamber 32 during use. More specifically, as seen in FIGS. 5 and 6, the grate assembly 30 may be pivoted into the chamber 32 such that the grate 34 is positioned to act as the bottom of the chamber 32. Similarly, as best seen in FIG. 8, the grate assembly 30 may be pivoted out of the chamber 32 such that the grate 34 is positioned between the apertures 54, 56 of the first and second portions 24, 26.

The garlic press 20, referenced throughout and the parts thereof, may also include variations and/or additions. For example, the garlic press 20 and, more specifically, the body 22 need not be constructed from a zinc die-cast material, but may be constructed from any other type of metal, plastic, and/or other material able to be readily formed and usable with food related products. The shapes and sizes of the various parts including but not limited to the body 22, the grate assembly 30, and the plunger assembly 28 may vary from the embodiments disclosed herein. Similarly, the first, second, and/or third pivot assemblies 48, 70, and 90, respectively, may have alternate pivot structure and positions, to enable to the pivoting of the body 22, the plunger assembly 28, and/or the grate assembly 30.

In operation, the user may open the garlic press 20, such that the plunger assembly and/or the grate assembly 30 are free to pivot about their respective pivot assemblies. The user may then lower the grate assembly 30 into position, by pivoting the grate assembly 30 about the third pivot assembly 90, as seen in FIGS. 5 and 6. More specifically, the grate assembly 30 may be pivoted, such that the grate 34 creates a floor to the chamber 32 and a bottom of the grate 34 is substantially in the same plane as a bottom of the chamber 32. As such, at least a portion of the lower surface 77b of the upper lever arm 76a is in contact with the inner surface 73 of the lower portion 26 of the body 22, and at least a portion of the outer surface 79b of the lower lever arm 76b is in contact with the inner surface 81 of the chamber 32.

Figure 7:
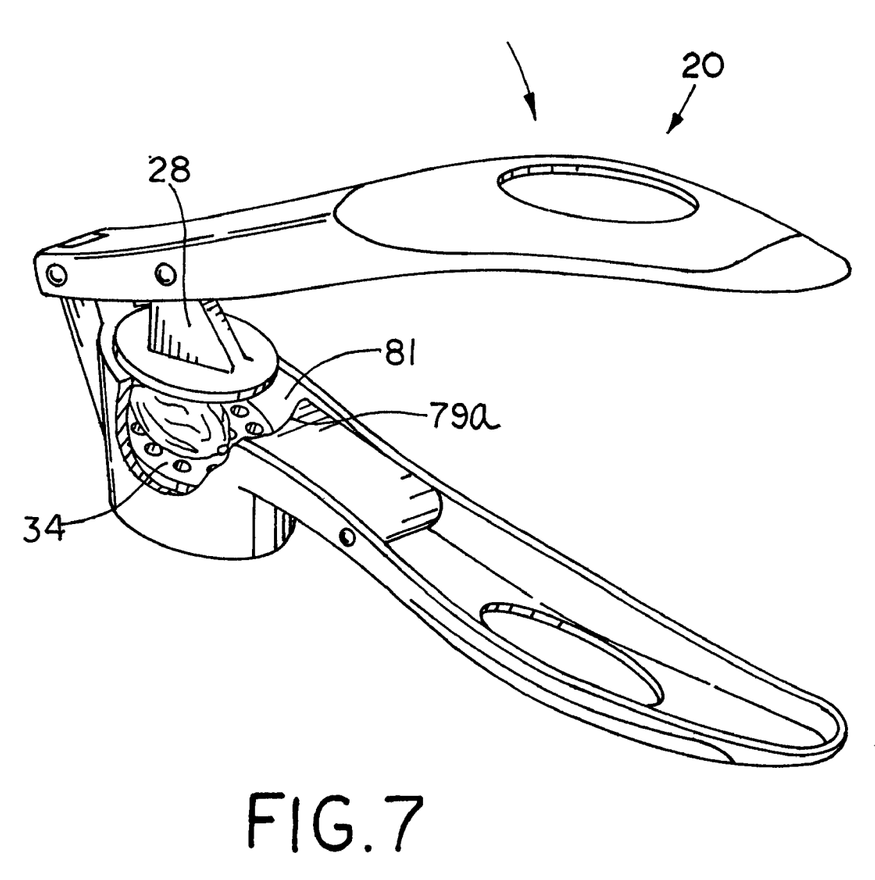
FIG. 7 is an isometric view of the garlic press of FIG. 1 in operation.

As seen in FIG. 7, the user may then insert or place the object to be presses, such as the garlic clove, into the chamber 32. As such the garlic clove may rest upon the grate 34, and may contact the inner surface 81 of the chamber 32 and/or the inner surface 79a of the lower lever arm 76b.

The user may then align and engage the plunger assembly 28 into position, by pivoting the plunger assembly 28 about the second pivot assembly 70, as seen in FIGS. 5 and 6. More specifically, the plunger 36 assembly 28 may be pivoted, such that the plunger 36 aligns and/or engages an upper portion of the chamber 32.

The user may then squeeze or otherwise pivot the body 22 and, more specifically, pivot the upper portion 24 and the lower portion 26 about the first pivot assembly 48 such that the plunger assembly 28 is forced into the chamber 32 and toward the grate 34. The garlic clove, once sufficient force is placed on the plunger 36, may then exit the chamber 32 through the apertures 83 of the grate 34 as pressed, peeled, or otherwise processed garlic. The user may then squeeze or otherwise force the plunger 36 toward the grate 34 until the garlic clove is selectively processed to the user's liking.

Figure 9:
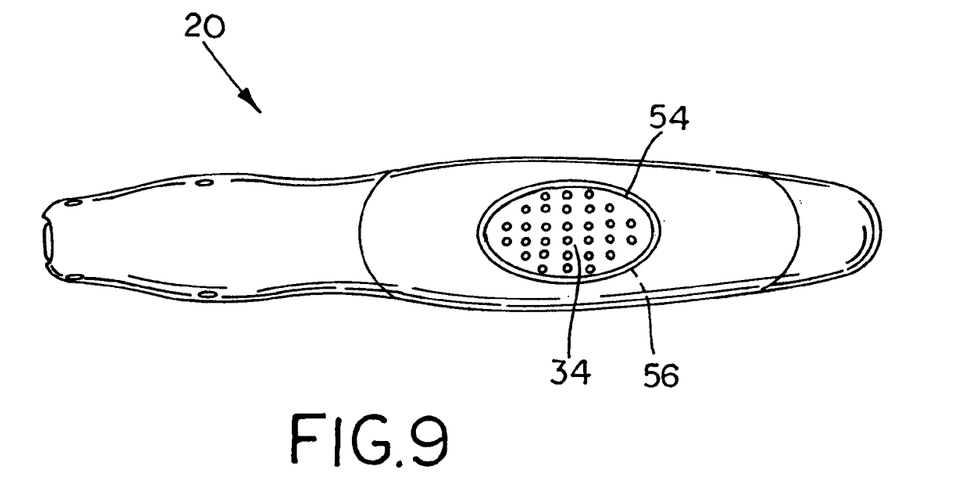
FIG. 9 is a top view of the garlic press of FIG. 1 in the cleaning state.

After the garlic clove is processed, the user may easily clean the garlic clove remains from the garlic press by first removing the plunger 36 and then the grate 34 from the chamber 32. The user, with the plunger 36 and the grate 34 out of the chamber 32, may easily scrape, wash, and/or remove the remains from the remains from the plunger 36, the grate 34, and/or the chamber 32. Additionally, the user may place the garlic press in the rotated open or cleaning position, as seen in FIG. 8, such that the upper surface 77a of the upper lever arm 76a may rest on or contact the inner surface 73 of the lower portion 26 and the grate 34 is disposed between the apertures 54 and 56 on the upper and lower body portions 24, 26, respectively, once the garlic press 20 is closed. As such, the plunger 36 may again be disposed the chamber 32. In the open or cleaning position, the user may place the garlic press 20 in the dishwasher and/or under running water, directed through the opening 57, for cleaning and/or removing pressed garlic clove remains from the garlic press 20. More specifically, the grate 34 may be easily cleaned as both the upper and lower surfaces 80, 82 of the grate 34 may be directly exposed to cleaning agents, such as the running water, by access of the cleaning agents to the grate 34 via the opening 57 formed by the apertures 54, 56 (FIG. 9). Similarly, the plunger 36 and the chamber 32 may be easily cleaned as they may also be directly exposed to the cleaning agents through the chamber 32.

Although certain embodiments of a garlic press 20 have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A food press comprising:
   an upper body including a first end and a second end;
   a lower body including a first end and a second end, the upper and lower bodies being pivotally connected to one another at their respective first ends and movable between an open spaced apart configuration and a closed pressing configuration;
   a handle on the second end of the upper body and on the second end of the lower body;
   a plunger disposed between the upper and lower bodies near the first ends;
   a chamber provided in the lower body, the chamber size and positioned to receive the plunger with the bodies in the pressing configuration; and
   a grate pivotally connected to the lower body and movable between a work position within the chamber and a cleaning position not within the chamber and sandwiched between the handles with the upper and lower bodies in the pressing configuration.

2. The food press of claim 1, further including at least one aperture through at least one of the handles of the upper and lower bodies.

3. The food press of claim 1, wherein the plunger is pivotally connected to the upper body.

4. The food press of claim 3, wherein the plunger is pivotally connected between the first and second ends of the upper body.

5. The food press of claim 1, wherein the grate is pivotally connected between the first and second ends of the lower body.

6. The food press of claim 1, wherein portions of the upper and lower bodies are constructed from a zinc die-cast material.

7. A food press comprising:
   a body having upper and lower portions pivotally connected to one another at one end at a body pivot;
   a handle disposed on ends of each of the upper and lower portions opposite the body pivot, at least one of the handles including a cleaning aperture;
   a plunger disposed between the upper and lower portions;
   a chamber having an inlet and an outlet disposed on the lower portion and configured and positioned to receive the plunger; and
   a grate pivotally connected to the lower portion and movable between a work position and a cleaning position, wherein the grate is disposed in the chamber in the work position and is disposed adjacent and exposed through the cleaning aperture and not in the chamber when in the cleaning position.

8. The food press of claim 7, wherein the cleaning aperture is on the handle of the upper portion and a second cleaning aperture is on the handle of the lower portion and aligns with the cleaning aperture.

9. The food press of claim 7, wherein the plunger is pivotally connected to the upper portion.

10. The food press of claim 9, wherein the plunger is pivotally connected near the body pivot to the upper portion.

11. The food press of claim 7, wherein the grate is pivotally connected between the cleaning aperture and the chamber of the lower portion.

12. The food press of claim 7, wherein parts of the body are constructed from a zinc die-cast material.

13. The food press of claim 8, wherein the grate is disposed adjacent and exposed through the second aperture in the cleaning position.

14. A food press comprising:
   first and second elongate body parts pivotally connected to one another at one end of the food press and movable between a spaced apart open configuration and a closely spaced pressing configuration;
   a cleaning aperture through each of the body parts, the cleaning apertures aligned with and facing one another in the pressing configuration;
   a pressing chamber disposed in one of the body parts near the one end;
   a plunger carried on the other of the body parts and received in the pressing chamber when the first and second body parts are in the pressing configuration; and
   a grate having a perforate surface coupled to a grate lever pivotally connected to one of the first and second body parts, the grate being movable between a work position with the perforate surface positioned within the pressing chamber and a cleaning position with the perforate surface not in the pressing chamber and positioned between the first and second body parts aligned with and exposed through the cleaning apertures when the body parts are in the pressing configuration.

15. The food press according to claim 14, wherein ends of the elongate body parts opposite the one end include handles and wherein the cleaning apertures are formed through the handles.

16. The food press according to claim 15, wherein the cleaning apertures are positioned between the opposite ends and a pivot point connecting the grate to the food press.

17. The food press according to claim 14, wherein the grate is pivotally connected to the second body part at a grate pivot.

18. The food press according to claim 17, wherein the pressing chamber is provided in the second body part between the one end of the food press and the grate pivot.

19. The food press according to claim 17, wherein the plunger is on the first body part.

20. The food press according to claim 14, wherein the plunger is pivotally connected to the first body part and wherein the grate is connected to the second body part.

21. The food press according to claim 14, wherein the plunger is connected to the first body part adjacent the one end of the food press.

22. The food press according to claim 14, wherein the plunger is pivotally connected to the first body part near the one end, wherein the grate is connected to the second body part, and wherein the pressing chamber is provided in the second body part between the pivotal connection of the grate and the pivotal connection of the plunger along the food press.

23. The food press of claim 14, wherein the first and second body parts are at least partly constructed from a zinc die-cast material.

* * * * *

UNITED STATES PATENT AND TRADEMARK OFFICE
CERTIFICATE OF CORRECTION

| | | |
|---|---|---|
| PATENT NO. | : 7,117,785 B2 | Page 1 of 1 |
| APPLICATION NO. | : 10/857661 | |
| DATED | : October 10, 2006 | |
| INVENTOR(S) | : Thomas B. Walker, III | |

It is certified that error appears in the above-identified patent and that said Letters Patent is hereby corrected as shown below:

Col. 5, claim 1, line 46, please delete "size" and insert --sized--.

Signed and Sealed this

Nineteenth Day of December, 2006

JON W. DUDAS
*Director of the United States Patent and Trademark Office*